United States Patent [19]

Illing et al.

[11] 4,285,500
[45] Aug. 25, 1981

[54] STUD BLOCK FOR AN ECCENTRIC ROTARY VALVE

[75] Inventors: Henry Illing, Parksville; Chauncey Newkirk, Wurtsboro, both of N.Y.

[73] Assignee: Kieley & Mueller, Inc., Middletown, N.Y.

[21] Appl. No.: 33,516

[22] Filed: Apr. 26, 1979

[51] Int. Cl.³ .......................... F16K 5/00; F16L 41/00
[52] U.S. Cl. ...................................... 251/367; 285/156; 137/315
[58] Field of Search ............... 251/367, 366, 148, 151, 251/152; 285/156, 363, 405; 137/315

[56] References Cited

U.S. PATENT DOCUMENTS

| | | | |
|---|---|---|---|
| 1,303,102 | 5/1919 | Monrath | 251/366 |
| 2,133,742 | 10/1938 | Forbes | 251/366 |
| 2,195,003 | 3/1940 | Danvers | 285/363 |
| 3,348,804 | 10/1967 | Piccardo | 251/367 |
| 3,636,972 | 1/1972 | Scaramucci | 251/367 |
| 3,847,374 | 11/1974 | Tittelbach | 285/156 |
| 3,982,727 | 9/1976 | Nelimarkka | 251/152 |
| 4,164,343 | 8/1979 | Graebner | 137/315 |

Primary Examiner—Martin P. Schwadron
Assistant Examiner—A. Michael Chambers
Attorney, Agent, or Firm—Kenyon & Kenyon

[57] ABSTRACT

An eccentric rotary valve housing is provided which can be used in a flangeless construction or a flanged construction. In the flangeless construction, a stud block is recessed to pass around the offset neck portion and is of a size to resist bending and torsion stresses equal to those in the tie bolts. In the flanged construction, a pair of rings are keyed on the housing to cooperate with flanged pipes.

7 Claims, 6 Drawing Figures

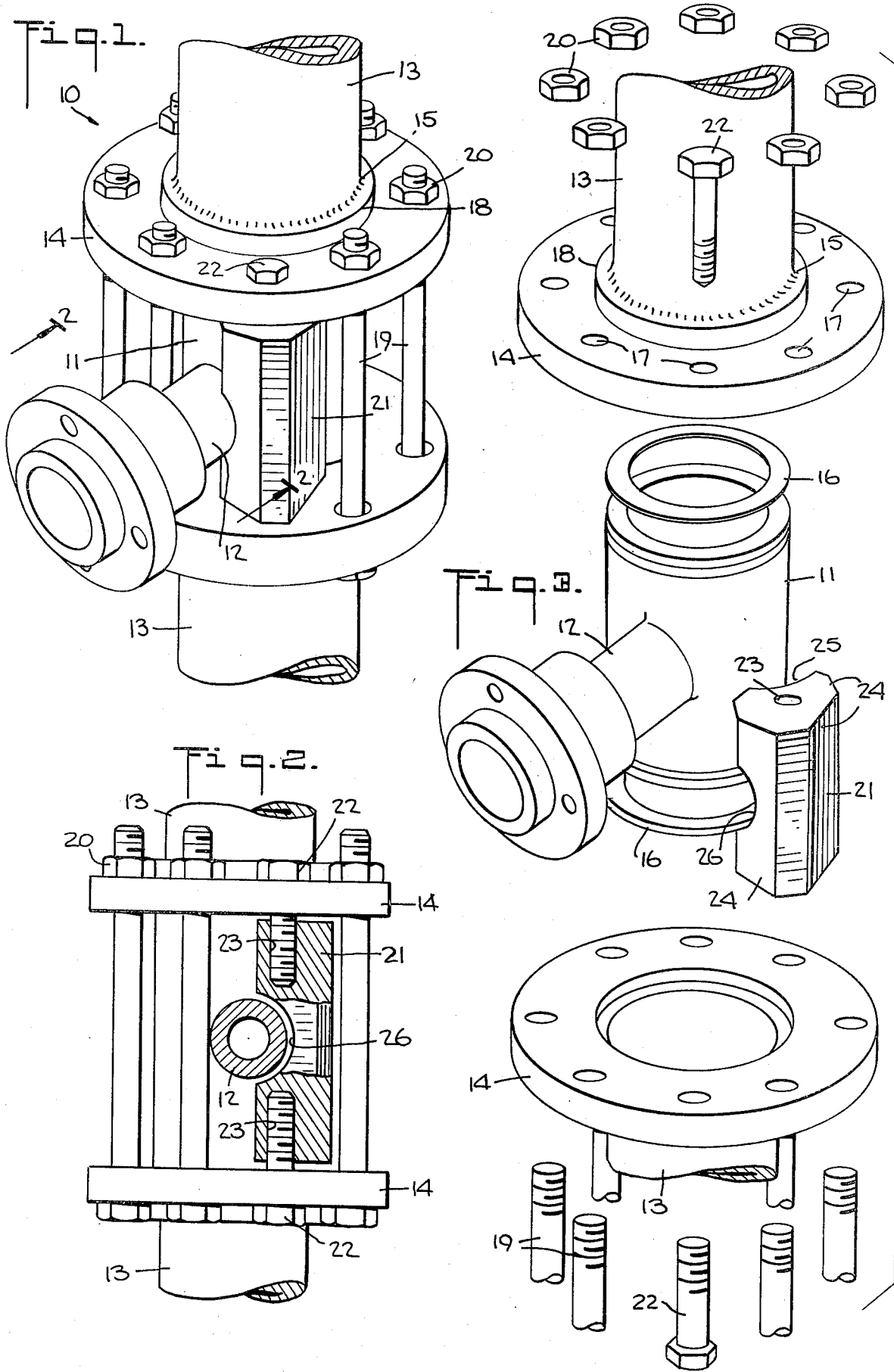

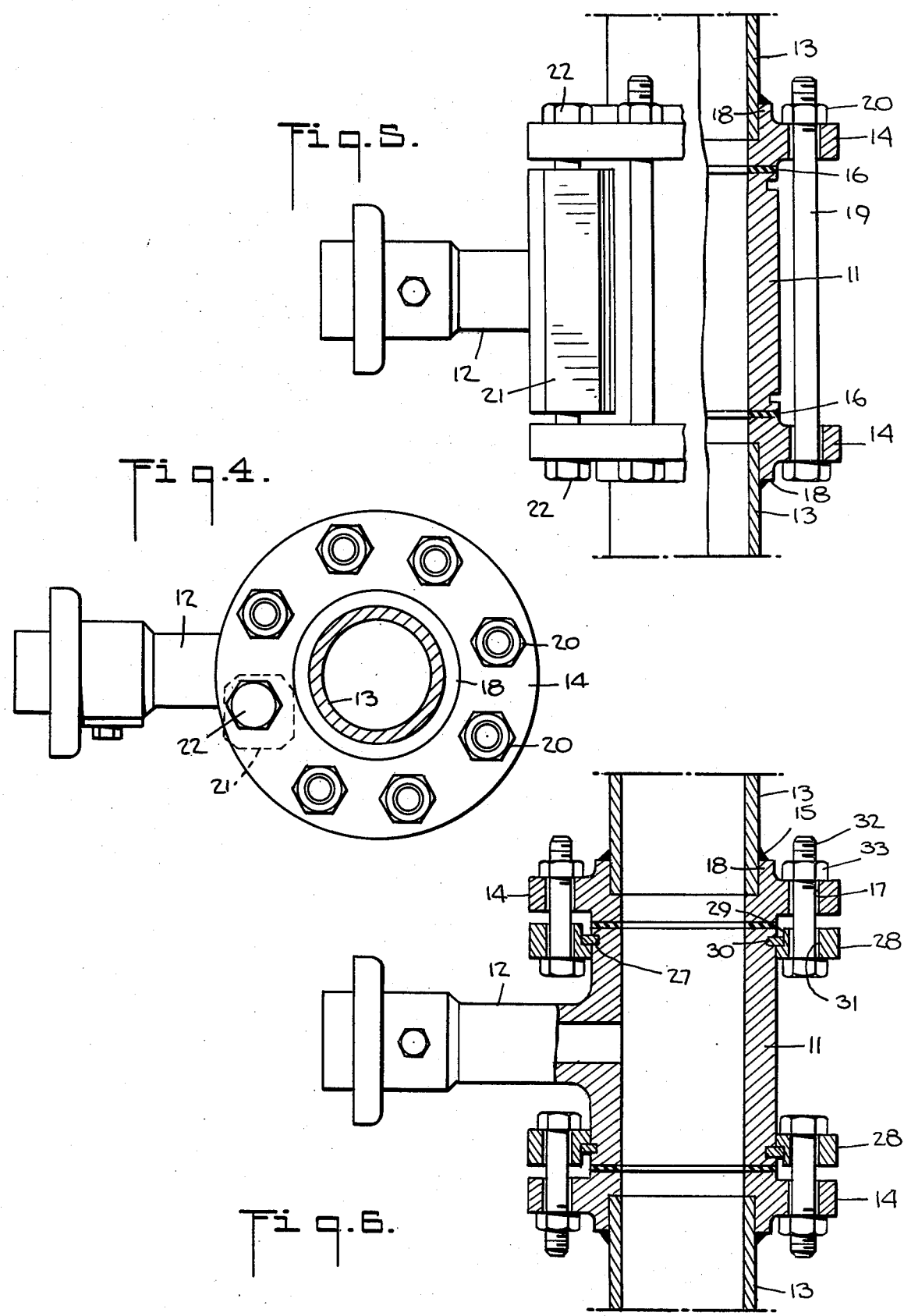

STUD BLOCK FOR AN ECCENTRIC ROTARY VALVE

Heretofore, it has been known to fabricate a housing for an eccentric rotary control valve with a cylindrical body part and a radially offset neck part. In some cases, flanges have been provided at the ends of the cylindrical part. However, because the known standards for steel pipe flanges and flanged fittings, such as the American National Standards Institute (ANSI) standards, generally require equal spacings for bolts to secure the valve housing to a flanged pipe end, a problem is created in attempting to use elongated tie bolts to secure the flanges in place. Specifically, because the neck part is offset radially, the neck part frequently interferes with the path of a tie bolt.

In order to overcome this problem, provision has been made for avoiding the interference between the neck part and a tie bolt. For example, in one known case, ears have been cast into the housing adjacent each end in offset relation to the neck part and in alignment with a bolt hole of a flange in order to receive a shortened bolt for securing the flange in place. In this case, the shortened bolts terminate short of the neck part. In other instances, it has been known to cast a lug at each end of the housing so as to receive a threaded bolt. However, these constructions cause problems. For example, the cast-in ears can cause body distortion with resulting seat ring leakage due to the cantilever stresses which are imposed in bolting. Further, cast-in ears are inherently weak in bending and can be broken by overtorquing of the bolts or by spurious pipeline bending movements. Lugs, on the other hand, cause local porosity during pouring of the casting and must be machined back to allow bolt head clearance when detachable flanges are used. Further, neither the ear construction nor the lug construction allows for a common machining for both flanged and flangeless construction. Thus, the quantity of inventory must be relatively large.

Accordingly, it is an object of the invention to allow a standard flange bolting of rotary control valves without integrally cast ears or lugs.

It is another object of the invention to allow one body configuration to be used for any ANSI pressure rating.

It is another object of the invention to allow a flanged or flangeless body construction from one body configuration.

It is another object of the invention to provide a simple means of securing flanges in place on an offset housing utilizing ANSI standards.

Briefly, the invention provides a housing for an eccentric rotary control valve which has a cylindrical body part and a neck part extending in offset relation from the cylindrical body part. In this regard, the cylindrical part has a longitudinal axis and a smooth uninterrupted outer surface while the neck part extends on an axis radially offset from the longitudinal axis of the body part. This housing can be used for either a flanged construction or a flangeless construction. Thus, the inventory necessary can be substantially reduced since a single housing can be used for either type construction.

In a flangeless construction, the housing cooperates with a pair of flanged pipes which are disposed at opposite ends of the cylindrical body part, a plurality of draw bolts which extend co-axially of the cylindrical body part through the flanges to secure the flanged pipes and housing together, a stud block between the flanges and a pair of cap screws, each of which passes through a respective flange into threaded engagement with the stud block. The cap screws and draw bolts are disposed at equal spacings about the flanges and, for this purpose, the flanges each have a plurality of equi-spaced peripherally disposed apertures.

The stud block is of a generally square cross-sectional shape with three sidewalls and one curvilinear sidewall facing the housing. In addition, the stud block has a recess in the curvilinear sidewall which partially encompasses the neck part of the housing. The generally square shape of the block allows wrenching and the cross-section is sized to take both bending and tension stresses from bolting of the valve in a pipeline. For maximum strength and minimum size, the stud block is coped to the outside of the valve body but with a one-eighth inch minimum clearance to avoid unwanted forces and stresses on a shell of the valve housing.

In a flanged construction, two flanges which are separate from the housing are mounted on the housing. In this embodiment, the cylindrical body part of the housing is provided with an outer annular groove near each end for receiving a circular key to secure a received flange on the body part.

These and other objects and advantages of the invention will become more apparent from the following detailed description and appended claims taken in conjunction with the accompanying drawings in which:

FIG. 1 illustrates a perspective view of an eccentric rotary control valve constructed in accordance with the invention between two pipes;

FIG. 2 illustrates a view taken on line 2—2 of FIG. 1;

FIG. 3 illustrates an exploded view of the parts of the control valve shown in FIG. 1;

FIG. 4 illustrates an end view of the housing of the control valve of FIG. 1.

FIG. 5 illustrates a part cross-sectional view of the valve parts shown in FIG. 1; and FIG. 6 illustrates a further embodiment of the eccentric rotary control valve having a flanged housing in accordance with the invention.

Referring to FIG. 1, the housing 10 for an eccentric rotary control valve includes a cylindrical body part 11 having a longitudinal axis and a smooth uninterrupted outer surface, as well as a cylindrical neck part 12 which extends from the body part 11 on an axis radially offset from the longitudinal axis of the body part 11. The body part 11 is generally constructed to be inserted between two pipes 13 in a pipeline to form a continuation between the two pipes 13. The neck part 12 generally serves as a housing for a rotary valve body (not shown) which is able to seat on a suitable seating surface (not shown) disposed within the cylindrical body part 11 to open and close the pipeline. The details of such a construction are not further shown as such are not necessary for an understanding of the invention.

Referring to FIG. 1, each pipe 13 is provided with a flange 14 which is welded onto the end of the pipe 13 via a weld 15. Each flange 14 is of annular shape and is butted against a respective end of the housing 11 with a sealing gasket 16 sandwiched between the flange 14 and housing 11 (FIG. 5). Each flange 14 also has a plurality of equi-spaced, peripherally disposed apertures 17 generally disposed on a spacing according to ANSI (American National Standard Institute) flange standards as well as a raised annular portion 18 which receives the end of a pipe 13.

In addition, a plurality of draw bolts 19 extend coaxially of the cylindrical body part 11 through the flanges 14 and receive suitable nuts 20 at the free ends in order to secure the flanges 14 to the body part 11 and to each other. Also, a stud block 21 is disposed between the flanges 14 and receives a pair of cap screws 22. As indicated, each cap screw 22 passes through an aperture 17 in a respective flange 14 into coaxial threaded engagement with a threaded bore 23 in an end of the stud block 20.

Referring to FIGS. 2 and 3, the stud block 21 extends between the flanges 14 and is of a length to extend around the neck part 12. The block 21 is also shaped to fit substantially within the contours of the flanges 14 and, for example, has a generally square cross-sectional shape with three flat sidewalls 24 and a curvilinear sidewall 25 facing the housing 10. This square shape of the stud block 21 allows wrenching when the cap screws 22 and stud block 21 are put in place. Also, a recess or coping 26 is disposed in the curvilinear sidewall 25 to partially encompass the neck part 12. As indicated in FIG. 2, the recess 26 is spaced from the neck part 12 by a distance of, for example, one-eighth inch. This clearance between the stud block 21 and the neck part 12 reduces the risk of damaging of the housing 10 when the stud block 21 is bolted in place, for example, should one side of the stud block 21 be offset from the other.

The stud block 21 is of a material, such as carbon steel or any other suitable ferrous or non-ferrous material, and size sufficient to take bending and torsion stresses equivalent to the bending and torsion stresses in the draw bolts 19.

As indicated in FIG. 2, each draw bolt 19 is able to pass between the flanges 14 on a straight longitudinal axis. However, because of the ANSI standards for bolt or aperture spacing, the neck part 11 of the housing 10 projects into the plane of the center line on which the cap screws 22 are located (FIG. 4). However, the stud block 21 permits the cap screws 22 to be utilized while, in effect, passing the forces generated in the cap screws 22 around the neck part 12.

Referring to FIG. 6, wherein like reference characters indicate like parts as above, the housing 10 may also be used to form a flanged construction. To this end, an annular ring 28 is fitted over each end of the body part 11 to form a flange. In order to retain the rings 28 on the body part 11, an annular groove 27 is formed near each end of the body part 11 and a circular key 30 is fitted into each groove 27 in projecting manner. As shown, each ring 28 has a recess 29 on the inside to receive the projecting portion of a circular key 30. The keys 30 may be of split construction to be easily fitted into a groove 27. Each ring 28 also has a plurality of equi-spaced apertures 31 which are aligned with the apertures 17 of an abutting flange 14 of a pipe 13. The respective flanges 17 and rings 28 are secured together by means such as bolts 32 and nuts 33.

When the nuts and bolts 33, 32 have been tightened, the annular rings 28 are securely held against the flanges 14 of the pipes 13 as well as against the keys 30. In order to disassemble this construction, the nuts and bolts 31, 32 are loosened and removed; the housing 10 and pipes 13 are separated and the rings 28 moved toward the neck part 12. The keys 30 can then be removed and the rings 28 thereafter slid off the housing body part 11.

The invention thus provides a housing which can be used for any ANSI pressure rating. Further, the invention provides one body configuration which can be used for flanged or flangeless body construction.

The invention further provides a housing with a smooth uninterrupted outer surface so that there is no need for any integrally cast ears or lugs.

The invention further provides a construction which can reduce the number of parts which are kept in inventory since the housing can be used for various sizes and diameters of flanged constructions.

As an example of the NASI standards for pipe flanges and flanged fittings, reference is made to ANSI standard B16.5-1977 for class 150 through 600 steel pipe flanges and flanged valve fittings. For a nominal pipe size of from three inches to twelve inches, the standard number of bolts is either eight or twelve with the diameter of the bolts ranging from five-eights inch to seven-eights inches. Under such standards, the neck part of an eccentric rotary control valve housing interferes with the center line of one pair of aligned apertures.

What is claimed is:

1. In combination,
    a housing for an eccentric rotary control valve, said housing having a cylindrical body part disposed on a longitudinal axis and a neck part disposed on an axis extending in radially offset relation from said longitudinal axis of said cylindrical body part;
    a pair of flanges disposed about opposite ends of said cylindrical body part, each said flange having equi-spaced apertures therein;
    a plurality of draw bolts extending coaxially of said cylindrical body part and through at least some of said apertures in said flanges to secure said flanges together;
    a stud block disposed perpendicularly between said flanges in alignment with a pair of coaxial apertures in said flanges, said block being disposed between one of said draw bolts and said neck part and having a recess partially encompassing said neck part; and
    a pair of cap screws, each cap screw passing through a respective flange aperture into coaxial threaded engagement with said stud block, said cap screws and said draw bolts being disposed at equal spacings about said flanges.

2. The combination as set forth in claim 1 wherein said flanges are separate from said body part.

3. The combination as set forth in claim 1 wherein said stud block has a cross-section to take bending and torsion stresses equivalent to the bending and torsion stresses in said bolts.

4. The combination as set forth in claim 1 wherein said stud block is made of carbon steel.

5. The combination as set forth in claim 1 wherein said stud block has a generally square cross-sectional shape with three flat sidewalls and one curvilinear sidewall.

6. In combination,
    a housing for an eccentric rotary control valve, said housing having a cylindrical body part and a neck part extending in offset relation from said cylindrical body part;
    a pair of flanges disposed about opposite ends of said cylindrical body part;
    a plurality of draw bolts extending coaxially of said cylindrical body part and through said flanges to secure said flanges together;
    a stud block between said flanges, said block having a recess partially encompassing said neck part and a curvilinear surface facing said cylindrical body part; and
a pair of cap screws, each cap screw passing through a respective flange into threaded engagement with said stud block, said cap screws and said draw bolts being disposed at equal spacings about said flanges.

7. The combination as set forth in claim 6 wherein said stud block has a cross-section to take bending and torsion stresses equivalent to the bending and torsion stresses in said bolts.

* * * * *

UNITED STATES PATENT AND TRADEMARK OFFICE
CERTIFICATE OF CORRECTION

PATENT NO. : 4,285,500
DATED : August 25, 1981
INVENTOR(S) : Henry Illing, et al.

It is certified that error appears in the above—identified patent and that said Letters Patent is hereby corrected as shown below:

Column 4, line 10, change "NASI" to --ANSI--.

Signed and Sealed this

Eighth Day of December 1981

[SEAL]

Attest:

GERALD J. MOSSINGHOFF

Attesting Officer

Commissioner of Patents and Trademarks